United States Patent [19]
Mills et al.

[11] Patent Number: 5,892,479
[45] Date of Patent: Apr. 6, 1999

[54] ELECTROMAGNETIC TARGET GENERATOR

[75] Inventors: Klyte G. Mills, Seoul, Rep. of Korea; Thomas Maxwell; Elliot C. Bergsagel, both of Las Cruces, N. Mex.; Robert K. Richardson, Yuma, Ariz.

[73] Assignee: The United States of America as represented by the Secretary of the Army, Washington, D.C.

[21] Appl. No.: 903,336

[22] Filed: Jul. 30, 1997

[51] Int. Cl.$^6$ ........................................... G01S 7/40
[52] U.S. Cl. ........................ 342/172; 342/169; 342/170; 342/171
[58] Field of Search .................... 342/169, 170, 342/171, 172, 15; 434/2

[56] References Cited

U.S. PATENT DOCUMENTS

| | | | |
|---|---|---|---|
| 5,134,412 | 7/1992 | Baseghi et al. | 342/169 |
| 5,351,054 | 9/1994 | Fredericks et al. | 342/170 |
| 5,431,568 | 7/1995 | Fey et al. | 342/169 |

*Primary Examiner*—Ian J. Lobo
*Attorney, Agent, or Firm*—Paul S. Clohan; Mark D. Kelly

[57] ABSTRACT

The electromagnetic target generator of this invention is used to simulate a radar target for the purpose of testing and experimenting on a variety of weapon systems radars. The weapon system radar being tested emits a radar signal which is received by the target generator. The target generator delays, doppler shifts, and reemits the signal for receipt by the weapon system antenna. The simulated target presented to the radar system under investigation has digitally controlled range, radial velocity, coordinated doppler and radar cross section. This provides a realistic radar target return without requiring real targets. The radar system is exercised in inflight and tactical operational configuration and no part of the weapons system radar is bypassed. Delayed radar target replicas are indistinguishable from real target waveforms. The electromagnetic target generator may be used in locations which preclude the use of real radar targets, such as anechoic chambers, and also may be used in the field.

15 Claims, 2 Drawing Sheets

5,892,479

ELECTROMAGNETIC TARGET GENERATOR

BACKGROUND OF THE INVENTION

1. Field of the Invention

This invention relates to electronic devices used to test radar systems which detect a radar pulse from a system under test and which emit signals which simulate a radar echo in response to the radar pulse.

2. Description of Related Art

A target generator is used to simulate a target echo return of a radar system under test, for example, to determine whether the radar system is susceptible or vulnerable to electromagnetic radiation environments in the radio frequency spectrum from 50 MHZ to 18 GHz.

Such tests are often conducted in shielded radio frequency anechoic chambers. These investigations are conducted inside shielded enclosures to minimize the possibility of unauthorized intercept and also to isolate the measurements from outside interference sources.

In order to perform a comprehensive test of a weapon it is necessary to simulate the in-flight and or tactical operational configuration. In the case of an radio frequency missile system, the in-flight and tactical operational configuration would include a target which would be used to exercise the tracking functions of the missile system's radar. Providing a realistic radio frequency target inside an anechoic chamber has been a difficult task due to the limited area available. In the past, target generators have been used which introduce the target simulation signal into the radar system being tested by bypassing the system's antenna.

It is desirable to simulate a target as realistically as possible without tampering with the design of the weapon system. This application discloses a millimeter wave target generator which provides a well defined radio frequency target suitable for conducting repeatable experiments on a variety of weapon systems radars. This target generator can be modified to operate at any frequency band by simply using the appropriate local oscillator in the up/down frequency converter section. Also, with minor modification, the target generator is available for field portable operation as well as anechoic chamber operation.

SUMMARY OF THE INVENTION

This invention is a target generator which is used to test radar systems. The target generator simulates the existence of a target and includes information on the range of the simulated target from the radar system, the radial velocity, coordinated doppler and radar cross section. The radar system under test is not altered in any way and may be subjected to environmental influences. Each component of the radar system may be tested under tactical conditions.

The target generator has a receiving antenna which receives a radar signal from the radar system under test. A down frequency converter is used to convert the radar signal frequency to a frequency compatible with a digital radio frequency memory unit. The digital radio frequency memory unit converts the signal to a simulation signal containing a delay to convey information on range, and information on radial velocity, coordinated doppler and radar cross section. The signal frequency is then up converted to simulate that of the radar signal, and finally, the signal is emitted by an emitting antenna.

The objective of this invention is to provide a target generator which is able to simulate a radar echo signal having simulated information on target range, radial velocity, coordinated doppler and radar cross section.

Another objective is to provide a target generator which operates without connection to the radar system being tested.

Another objective is to provide a target generator which operates without requiring alteration of any aspect of the radar system being tested.

Another objective is to provide a target generator which may be used in an enclosed area or out in the open.

Another objective is to provide a target generator which includes means for recording data concerning the simulated targets which are generated.

A final objective is to provide a target generator which is inexpensive, reliable, and without harmful effect on the environment.

DESCRIPTION OF THE PREFERRED EMBODIMENT

Figure 1:
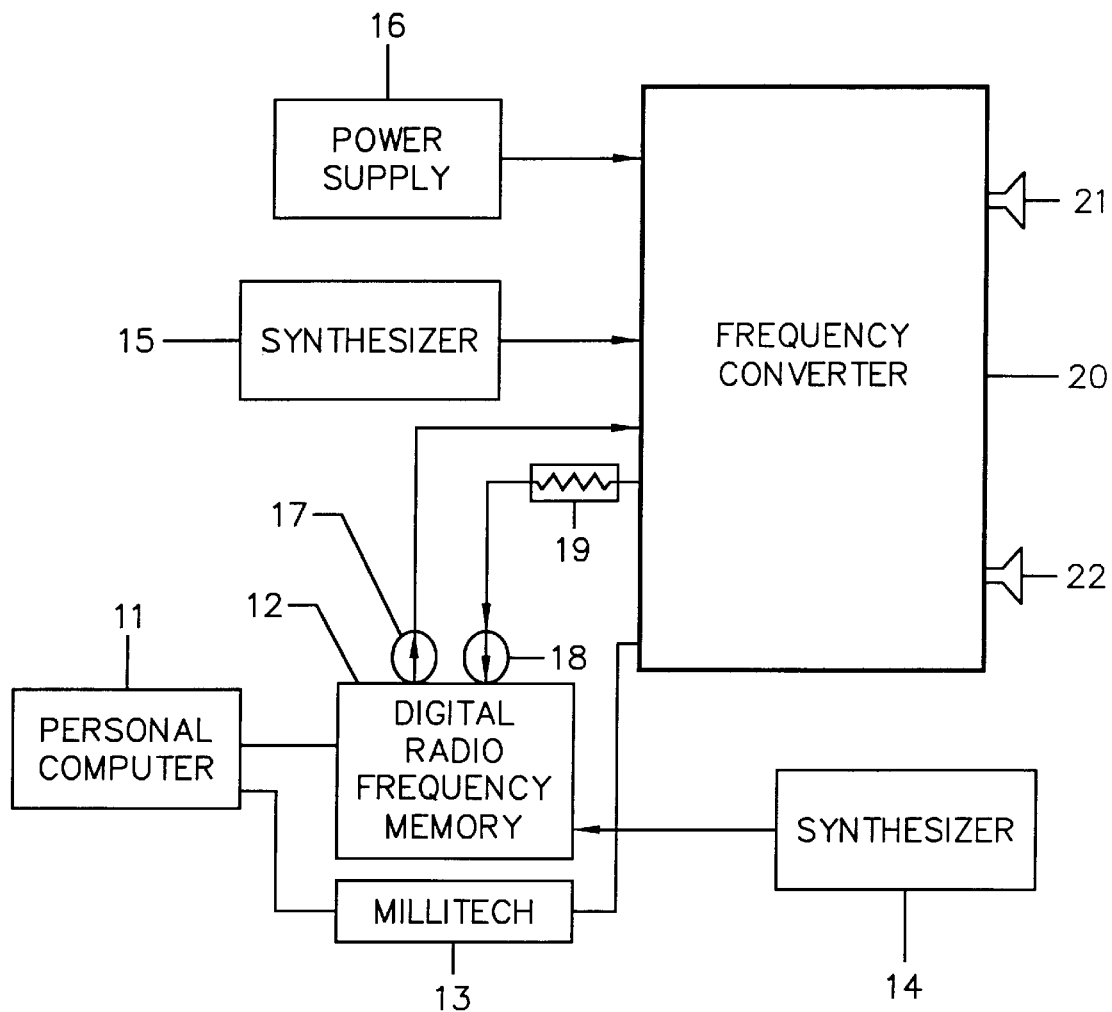
FIG. 1 is a block diagram of the target generator.

The target generator system consists of two basic parts and their support peripherals as shown in FIG. 1.

The target generator shown in FIG. 1 consists of a frequency converter 20 and a digital radio frequency memory 12 and associated accessories. The frequency converter 20 has a receive antenna 21 for receiving the signal from the radar system under test (not shown) and a transmit antenna 22 for emitting the simulated target echo signal. A power supply 16 powers the frequency converter. A synthesizer 15 provides a 100 MHZ reference signal to the frequency converter. The digital radio frequency memory 12 receives a signal from the frequency converter 20 via an attenuator 19 and an isolator 18. The digital radio frequency memory emits a signal to the frequency converter via an isolator 17. The digital radio frequency memory is controlled by a personal computer 11 which also controls the frequency converter 20 via a Millitech digital attenuator controller 13. A synthesizer 14 provides the digital radio frequency memory with a 14 GHZ reference signal.

Figure 2:
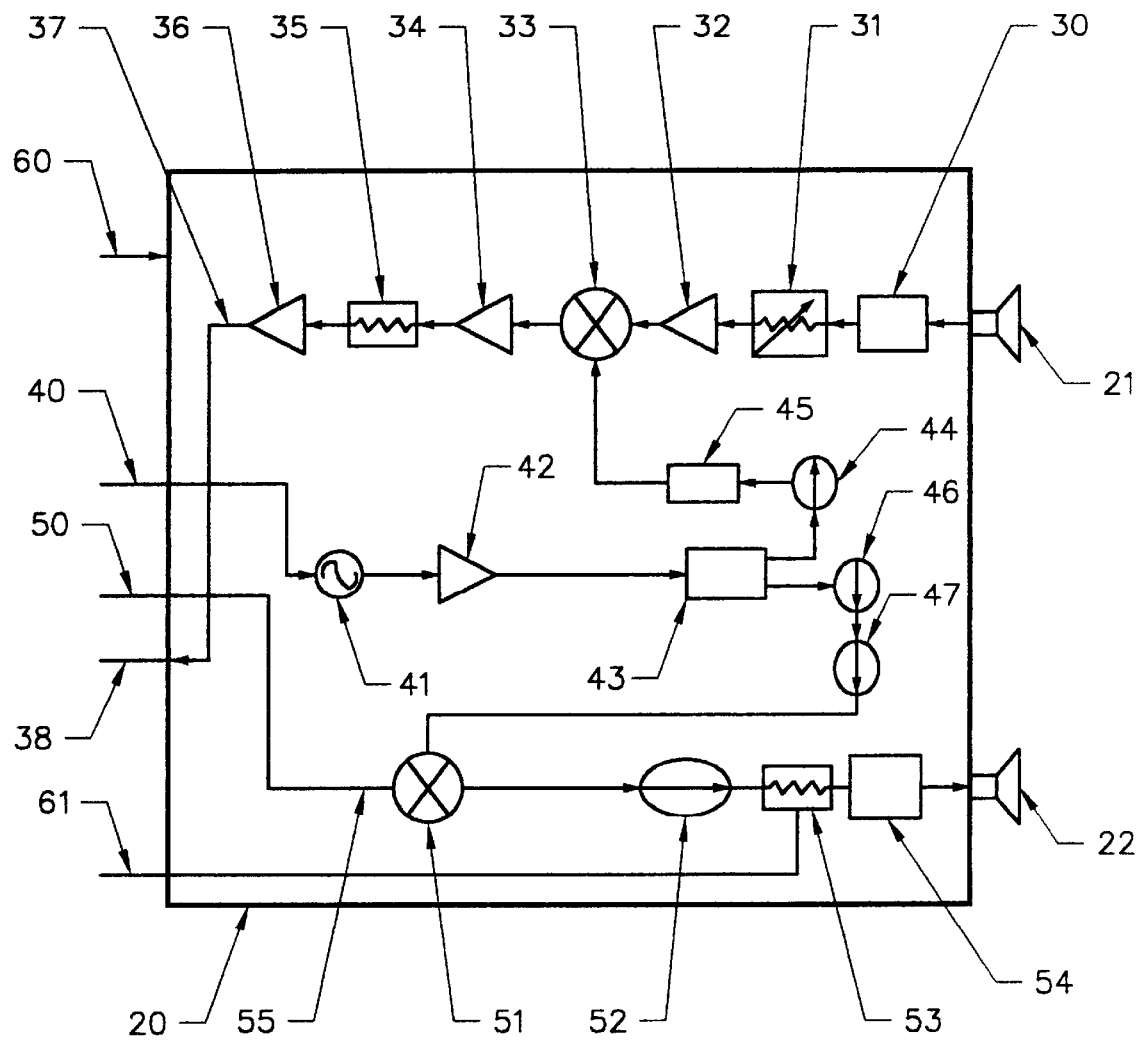
FIG. 2 is a schematic diagram of the frequency converter.

A schematic diagram of the frequency converter 20 is shown in FIG. 2. The frequency converter is powered by a power supply 16 in FIG. 1 through a line 60. The power supply is powered by a mains circuit, although suitable variations involve powering the power supply with a generator or with batteries. The receive antenna 21 receives a signal from the radar system under test at, for example, 35 GHZ. The signal passes in a down frequency circuit 37 consisting of a polarization switch 30, a variable attenuator 31, a buffer 32, and a mixer 33 where it is mixed with a signal at 25 GHZ, then through a buffer 34, attenuator 35, another buffer 36, and transmitted as a signal at 10 GHz to the digital radio frequency memory, 12 in FIG. 1 via line 38. A synthesizer 15 in FIG. 1 provides a 100 MHZ reference input at line 40 to a 25 GHz oscillator 41. The signal passes through a buffer 42 and a power divider 43. A portion of the signal passes through an isolator 44 and a filter 45 and enters the mixer 33. Another portion of the signal passes through an isolator 46 and another isolator 47 and enters mixer 51. The 10 GHz signal emitted by the digital radio frequency memory 12 in FIG. 1 enters the frequency converter at 50. The signal in the up frequency circuit 55 passes through a mixer 51 where it is mixed with a 25 GHz signal, then passes through isolator 52, digital attenuator 53, polarization switch 54 and out the transmit antenna 22. The frequency converter 20 is controlled by a personal computer 11 on FIG. 1 via a Millitech digital attenuator 13 on FIG. 1 through line 61. A Millitech digital attenuator controller receives an attenuation value from the computer and sets the attenuator to this value. The digital attenuator controls the output or transmitted power level. This directly translates to target size and range.

The first part is the up/down frequency converter 20 which provides the frequency conversion of a radar signal between the millimeter wave frequency region and the X-band frequency region.

The second part is a digital radio frequency memory 12 which performs the radar signal delay function. In a preferred embodiment, a KOR model 1023-20-000 digital radio frequency memory was used. It was manufactured by KOR Electronics, Inc., 11958 Monarch St., Garden Grove, Calif. 92641.

The target generator was designed to be deployed in the far field of a radar system under investigation and provides a dynamic target return signal to the radar. The simulated target presented to the radar system under investigation has digitally controlled range, radial velocity, coordinated doppler and radar cross section.

The heart of the target generator is the digital radio frequency memory which provides a precisely controlled delay of a received radar signal that is returned to the radar as a simulated target echo. The target generator incorporates a wideband digital radio frequency memory capable of handling pulsed or continuous wave radar signals with instantaneous operating bandwidths of up to 800 MHZ. All target and geometry parameters in the system are set, displayed, and dynamically controlled by a personal computer that also performs experiment data logging.

The target generator provides the capability to generate realistic radio frequency targets suitable for conducting repeatable investigations on a variety of radar systems. The experimental approach utilizing the target generator is distinctive in the following respects:

(1) The radar system is exercised in its inflight and tactical operational configuration-no part of the radar, such as the antenna, is bypassed by specialized signal injection.
(2) Realistic radar target returns are presented to the radar under investigation from a ground-based simulator location without requiring real targets. This allows investigations to be conducted inside anechoic chambers or other confined areas.
(3) Experiments are precise and repeatable due to well-known geometry and digitally-controlled signal parameters.

The target generator may be deployed in the far field of the radar system under investigation. In addition, it may be used inside a restricted chamber, for example, an anechoic chamber, where the effects of various experimental parameters on the radar system performance was determined. In this application, due to the physical limitations of the anechoic chamber, the target generator was merely placed in the main beam of the radar's antenna. The target generator required no connections to the radar system and was therefore unaffected by the radar system degradation. The target generator presented target return signals to the radar in the same manner as echo signals from a real target enter the system through its antenna. Since the target generator had a fixed azimuth relative to the radar, the simulated targets it generated are constrained to radial movement. Such constraints, however, were sufficient for experimental determination of standard performance metrics required for an electronic warfare vulnerability assessment of the radar system.

Digital Radio Frequency Memory

The digital radio frequency memory is designed to operate with an instantaneous bandwidth of 800 MHZ centered at 8.85 GHz using an internal local oscillator or centered on any other frequency from 8.8 to 10.0 GHz using an external local oscillator. This frequency flexibility gives it the capability to work directly at the operating frequency of many air defense radar systems as well as operate at an internal frequency for radar systems in other bands.

The target generator digital radio frequency memory performs its delay function by (1) converting an input radio frequency radar signal from analog to digital form, (2) storing the digital waveform samples in a memory, (3) reading them from memory after a specified delay, and (4) reconverting the digital samples back to analog form for output.

Quantization errors inherent in the sampling process limit the spurious-free input signal dynamic range to approximately 6 db per bit of analog-to-digital converter resolution. In practice, a rule of 5 db per bit is more realistic due to other system factors including the characteristics of the digital-to-analog converter at the output. The target generator digital radio frequency memory is an example of this rule, having a 4-bit amplitude resolution and 20 db dynamic range. Previous experience with 2-bit, 4-bit and 6-bit digital radio frequency memories over a 15 year period has shown that 4-bit amplitude resolution is sufficient for radar target simulation assuming input levels are properly adjusted. Delayed radar target replicas generated with this resolution have proven to be indistinguishable from real target waveforms when processed by a wide variety of air defense radar systems. These include continuous wave, pulsed, and pulsed doppler systems with and without phase coding. Control.

The target generator digital radio frequency memory design provides three recall modes of operation: (1) pipeline, (2) stretched pulse, and (3) multiple false targets. These modes are selected and exercised over a personal computer connected by a serial RS-232 interface to the digital radio frequency memory. Commands can be used which either select internal programs or perform direct control functions.

The control program for the target generator is run on a x86 personal computer in a DOS environment. The control program, dubbed the Computer Aided Target Simulator, is designed to dynamically control and display both target and jammer parameters as well as perform experiment data logging on disk files. The personal computer gives the digital radio frequency memory update information on speed (doppler shift) and distance (time delay) of the desired delayed signal.

The absolute Doppler shift depends on the radio frequency as determined by the Local Oscillator and the upconverted frequency. The range is from −300 Khz to +300 Khz from center frequency with a 19.5 Hz resolution. The digital radio frequency memory output is upconverted by mixing it with a 25 Ghz signal. At 35 Ghz a 300 Khz frequency shift equates to a velocity shift of approximately 1290 meters/sec.

Upon startup, the Computer Aided Target Simulator program changes the personal computer's real time clock frequency from 18 Hz to 100 Hz. This allows the program to update all dynamic parameters in the system 100 times per second to minimize target movement step sizes during data runs. The program is structured so that all system parameters are displayed on a single screen that is updated on a time available basis. Some of the parameters may be edited by the operator while others, such as doppler frequency, are derived and merely reported after calculation. Data run parameters are automatically documented with Runlog files that are saved on the disk with each run.

Up/Down Frequency Converter.

The frequency converter consists of two circularly polarized antennas, one transmit and one receive, polarization switches, a local oscillator, mixers, amplifiers and attenuators. In this application the local oscillator was set at 25 GHz so that the mmW frequency of the signal emitted by the radar system under test is converted down to the X-band frequency region, the operating region of the digital radio frequency memory. After treatment by the digital radio frequency memory, the now-altered signal is up converted to the mmW frequency used by the radar system. However, the target generator can be operated in any frequency region by simply applying a local oscillator of the appropriate frequency.

Target Generator Operation.

In order to provide a radar system under investigation with a realistic mmW target, the target generator was developed. The target generator is designed to receive a radar signal, time-delay, and feed back an radio frequency signal to simulate a target echo. The target generator is designed to operate around a center frequency of 35 GHz, capturing the waveform with any information that is riding on the 35 GHz carrier (i.e. limited frequency hop, doppler shift, and phase information)

The target generator is broken down into two basic parts and their support peripherals. The first part is the up/down frequency convertor which initially converts the incoming 35 GHz signal emitted from the radar under test to 10 Ghz. The down conversion side takes the incoming signal from the receive horn, passes it through a polarization switch, a variable attenuator, a filter, an amplifier, and mixes it with a 25 GHz local oscillator signal. This 25 GHz local oscillator uses a 100 MHZ external signal as a reference.

The down converted signal at 10 GHz is then used as input into the digital radio frequency memory, KOR model #1023-20-000. The digital radio frequency memory is controlled externally by an x86 personal computer that gives the digital radio frequency memory update information on speed (doppler shift) and distance (time delay) of the desired delayed signal. Use of an external local oscillator of 13.7 GHz for this application allowed the digital radio frequency memory to operate with 20 dB of dynamic range and an 800 MHZ instantaneous bandwidth, centered from 8.85 to 10 GHz.

The digital radio frequency memory performs its delay function by first converting the radio frequency input signal to digital form, storing the digital waveform samples to memory, then reading them back from memory after a specified delay and reconverting the digital samples back to an analog radio frequency output. The minimum delay is 100 nanoseconds and the maximum delay 582 microseconds.

The personal computer performs all the necessary calculations to modify the desired time delay of the incoming signal. The computer is given the actual physical distance from the target to the radar system under investigation, cable lengths, frequency, power level of the incoming radio frequency signal, and the desired delay in distance. After the computer calculates the delay, the updated information is fed to the digital radio frequency memory via an RS-232 link. Once the digital radio frequency memory has received the new delay information, it continues at that specified delay until new update information is received.

After the signal has been delayed the desired length of time, the digital radio frequency memory converts the stored digitized signal back to analog and outputs the 10 GHz signal. The 10 GHz signal is used as input to the up convert side and mixed with the same 25 GHz local oscillator to yield a time delayed 35 GHz signal. The 35 GHz signal is fed through the isolator to a digitally programmable attenuator, to a polarization switch and out the transmit antenna.

After emission from the transmit antenna, the signal is received by the antenna of the radar system under test. It is interpreted by the radar system as a signal which has been reflected by a target.

It will be apparent to those skilled in the art that the examples and embodiments described herein are by way of illustration and not of limitation, and that other examples may be used without departing from the spirit and scope of the present invention, as set forth in the appended claims.

We claim:

1. A target generator which receives a radar signal from a radar system, operates on the signal, and reemits an altered signal to simulate a target echo comprising:

a receiving antenna which receives the radar signal, a frequency converter which converts the radar signal frequency to a lower frequency signal compatible with a digital radio frequency memory unit, a digital radio frequency memory unit which converts said lower frequency signal to a simulation signal having the characteristics of a target echo signal except for its frequency, a frequency converter which converts said simulation signal to a higher frequency characteristic of said radar signal, a transmit antenna which emits said simulation signal, a power supply, and control means for controlling said target generator.

2. The target generator of claim 1 wherein said receiving antenna is a circularly polarized antenna.

3. The target generator of claim 1 wherein said transmit antenna is a circularly polarized antenna.

4. The target generator of claim 1 wherein said frequency converter converts said radar signal from 35 GHz to 10 GHz.

5. The target generator of claim 1 wherein said frequency converter converts said simulation signal from 10 GHZ to 35 GHZ.

6. The target generator of claim 1 further comprising a synthesizer for providing a 100 MHz reference signal to said frequency converter.

7. The target generator of claim 1 further comprising a synthesizer for providing a 14 Ghz reference signal to said digital radio frequency memory.

8. The target generator of claim 1 wherein said frequency convertor comprises a down frequency circuit, a reference circuit, and an up frequency circuit.

9. The target generator of claim 1 wherein said control means is a personal computer.

10. The target generator of claim 1 wherein said simulation signal differs from said radar signal in doppler shift and time delay.

11. The target generator of claim 10 wherein said simulation signal differs from said radar signal by a Doppler shift of from −300 KHz to +300 KHz.

12. The target generator of claim 10 wherein said simulation signal differs from said radar signal by a time delay of from 100 nanoseconds to 582 microseconds.

13. The process of generating a simulation signal using a target generator comprising the steps:
   a. receiving a radar signal from a radar system by means of a receiving antenna,
   b. converting said radar signal to a signal compatible with a digital radio frequency memory by means of a frequency converter,
   c. transmitting said converted radar signal to said digital radio frequency memory,
   d. altering said converted radar signal to simulate a radar echo by means of said digital radio frequency memory,
   e. transmitting said altered radar signal to a frequency converter,
   f. converting said altered radar signal to a signal compatible with said radar system using said frequency converter, and
   g. transmitting said altered radar signal by means of a transmitting antenna.

14. The process of claim 13 further comprising the step:
   h. controlling said altering said converted radar signal to simulate a radar echo by means of said digital radio frequency memory using a personal computer.

15. The process of claim 14 further comprising the step of:
   converting said personal computer's real time clock frequency from 18 Hz to 100 Hz.

* * * * *